United States Patent
Megiddo et al.

(10) Patent No.: US 6,658,642 B1
(45) Date of Patent: Dec. 2, 2003

(54) SYSTEM, METHOD AND PROGRAM PRODUCT FOR SOFTWARE DEVELOPMENT

(75) Inventors: Nimrod Megiddo, Palo Alto, CA (US); Xiaoming Zhu, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 534 days.

(21) Appl. No.: 09/598,675

(22) Filed: Jun. 21, 2000

(51) Int. Cl.[7] ............................. G06F 9/44; G06F 17/60
(52) U.S. Cl. ........................... 717/101; 717/124; 705/1; 705/9
(58) Field of Search ................................. 717/100–124; 709/1, 12, 102, 106, 201, 205, 223; 705/1, 7–9

(56) References Cited

U.S. PATENT DOCUMENTS

| | | | |
|---|---|---|---|
| 5,511,199 A | | 4/1996 | Anthias et al. ............. 709/315 |
| 5,546,594 A | | 8/1996 | Wazumi ...................... 709/317 |
| 5,737,739 A | | 4/1998 | Shirley et al. .............. 715/512 |
| 5,758,160 A | * | 5/1998 | McInerney et al. ......... 717/104 |
| 5,893,106 A | | 4/1999 | Brobst et al. ................ 707/102 |
| 5,903,897 A | * | 5/1999 | Carrier, III et al. ......... 707/203 |

OTHER PUBLICATIONS

Jeffrey Voas, An Approach to Certifying Off–the–Self Software Components, 1998, Reliable Software Technologies Corporatio.*

Skaf–Charoy–Godart, Maintaining Consistency of Cooperative Software Development, 1996, CRIN/CNRS.*

Weinreich–Altmann, An Object–oriented Infrastructure for a Cooperative Software Development Environment, Nov. 1997, ITESM.*

Wegberg–Breends, Competing communities of users and developers of computer software: competition between open source sofware and commercial software, May 2000, NIBOR working paper, NIBOR/RM/00/001.*

Cosource.com Competitve Market for Open Source. (www.cosource.com).

Vertiteam Distributed Software Engineering (www.veriteam.com)1.

* cited by examiner

*Primary Examiner*—Hoang-Vu Anthony Nguyen-Ba
(74) *Attorney, Agent, or Firm*—Marc D. McSwain; Charles W. Peterson, Jr.

(57) ABSTRACT

A system, method and program product for computer program development. A new computer program to be developed is outlined and the outline organized to identify required modules. Required modules are provided to the system, which categorizes them and posts a list of required modules with corresponding requirements on, for example, a dedicated web site. Module requirements may include module specifications, a corresponding price and a deadline. Software developers intending to participate may provide an intention to submit. If fewer than two developers intend to submit module candidates for one or more required modules, the computer program outline may be reorganized to encourage more participants. For each required module where at least two module candidates are received, the candidates are tested for compliance with corresponding module requirements. A module candidate is selected for each required module for inclusion as a module included in the software package and payment is transferred to developers of the selected module candidates. The selected module, candidates may be included in the computer program and the computer program may be tested.

23 Claims, 3 Drawing Sheets

SYSTEM, METHOD AND PROGRAM PRODUCT FOR SOFTWARE DEVELOPMENT

BACKGROUND OF THE INVENTION

1. Field of the Invention

The present invention generally relates to software development systems and more particularly, the present invention relates to systems and methods of software development wherein individual software modules are developed for a unified project or software product by independent programmers that may be remotely located.

2. Background Description

The high-tech industry is moving very fast and the first to market has a big advantage over competitors, often deciding the early winner. So, speeding up software development increases the likelihood of success. One way to speed up software development is to increase the number of programmers on the project, distributing the workload to as many programmers as possible. Unfortunately, hiring people for a very short period of time complicates rather than simplifies development.

Further, currently there is a severe shortage of computer programmers. Even employers that are willing to pay high salaries frequently are unable to find enough skilled programmers to meet requirements for a particular programming job. So, to supplement their permanent workforce, companies are forced to contract with independent contractors, delegating customized or specialized software development to the contractors. Typically, the contractors are paid either in advance or, incrementally, as the project progresses. Regardless of how much the package developer may be willing to pay, contractors still face the same programmer shortage.

As a result, with the advent of Internet, to maximize the number of programmers working on a particular project, collaborative software development projects, such as open source software development (e.g., Linux), are undertaken or initiated daily. Web based electronic businesses (e-businesses) have formed offering contractors a solution to temporary programmer shortages. One such e-business is an auction site (www.cosource.com) for software development contracts, focusing on the needs of open source development. However, this approach matches a single programmer with each task. Money is paid in advance with the package developer bearing the risk that the project will not complete on schedule.

Accordingly, there is a need for reducing software development time and costs, while increasing the likelihood of software development success.

SUMMARY OF THE INVENTION

It is therefore a purpose of the present invention to reduce software development time and development costs;

It is another purpose of the invention to increase the likelihood of success for software development projects;

It is yet another purpose of the present invention to reduce software development time and costs, while increasing the likelihood of software development success.

The present invention is a system, method and program product for solving software development needs of customers by unleashing the full potential of world-wide skilled personnel, with the possibility that when the offered price is high, many developers will try to compete and deliver a module even with no money up front. A new computer program to be developed is outlined and the outline organized to identify required modules. Required modules are provided to the system, which categorizes them and posts a list of required modules with corresponding requirements on, for example, a dedicated web site. Module requirements may include module specifications, a corresponding price and a deadline. Software developers intending to participate may provide an intention to submit. If fewer than two developers intend to submit module candidates for one or more required modules, the computer program outline may be reorganized to encourage more participants. For each required module where at least two module candidates are received, the candidates are tested for compliance with corresponding module requirements. A module candidate is selected for each required module for inclusion as a module included in the software package and payment is transferred to developers of the selected module candidates. The selected module candidates may be included in the computer program and the computer program may be tested.

BRIEF DESCRIPTION OF THE DRAWINGS

The foregoing and other objects, aspects and advantages will be better understood from the following detailed preferred embodiment description with reference to the drawings, in which.

DETAILED DESCRIPTION OF A PREFERRED EMBODIMENT OF THE INVENTION

Figure 1:
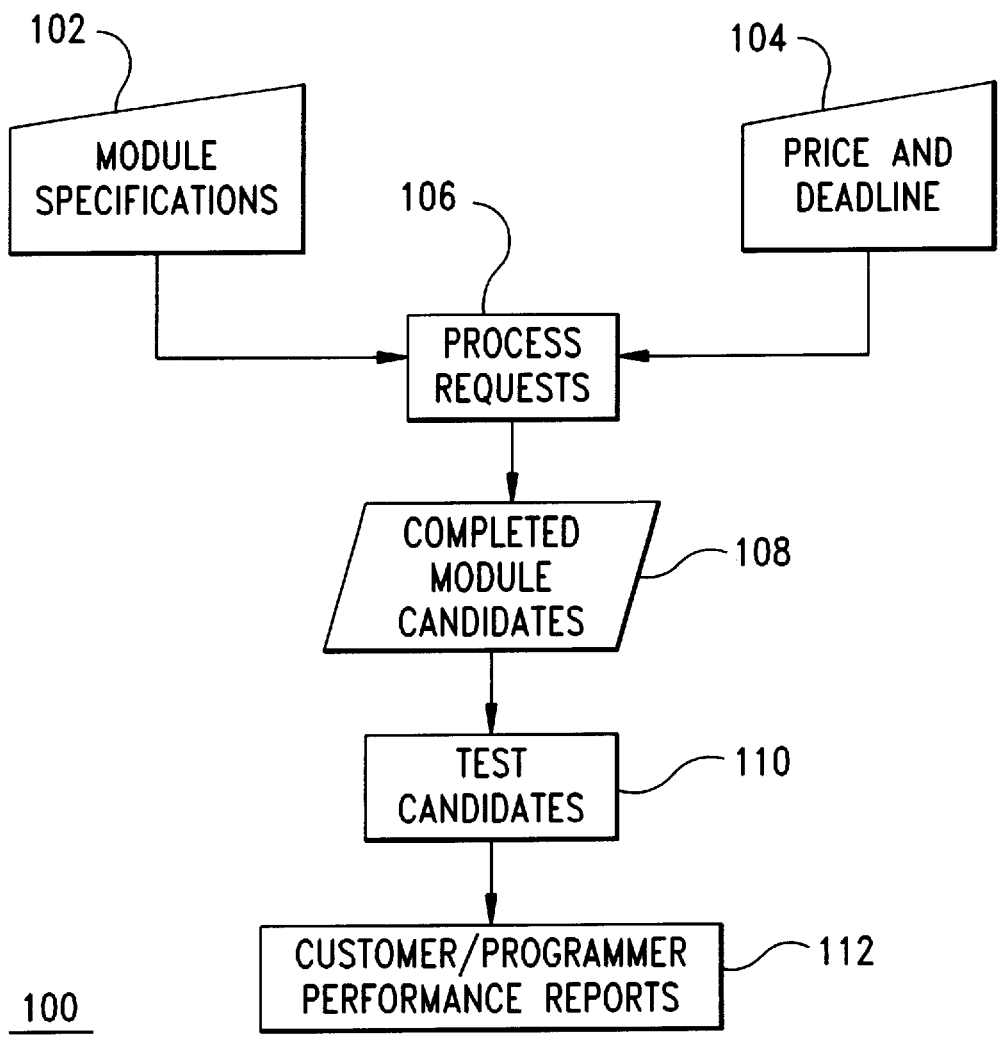
FIG. 1 shows an overview of the software development method of the present invention, wherein a proposed computer program is modularized and independent programmers compete to develop modules, the best modules being selected for inclusion in the final program.

Referring now to the drawings, and more particularly, FIG. 1 shows a flow chart 100, which is an overview of the preferred method of software design according to the present invention. The present invention is a software design system, method and program product wherein a proposed software package is modularized and independent programmers compete to develop each of the modules or pieces. The software package may be, for example, a program, application or system, such as an operating system. For each of the modules, the best completed design is selected for inclusion in the final package design. The system allows a package developer (a high level program or software developer, e.g., a prime contractor or "prime") designing a new software package to register as a customer. By availing himself/ herself of the system, the registered package developer receives independently developed module candidates for each required module from completely independent sources (e.g., programmers). The package developer selects and pays for only the best modules from those received.

First, the program developer or customer prepares the proposed program package for development in step 102, outlining the program package to identify modules required for the package. The package may be outlined to identify, for example, individual isolatable functions, allowing the customer to partition the program according to identifiable need for each module, such as functionality and requisite developer programming skill level. For example, the customer may specify a module with a certain C++ class that includes functions having specified inputs and outputs. User-interface code may be partitioned and assigned to one module, while telecommunications code may be assigned to another. Optionally, the customer may be allowed to specify the module requirements in higher level languages or pseudocode.

Simultaneously, in step 104, the customer specifies a development deadline and a price for each selected module. The price is to be paid to the winning participant, i.e., the programmer whose module candidate is selected. The price is selected, typically, to elicit an acceptable participation level, e.g., participation of at least two independent competing developers. Thus, the customer may select a price, somewhat below what the customer is willing, ultimately, to pay for the requested module, increasing the price as desired to encourage additional participation. Otherwise, the customer may just specify a top offering price.

Figure 2:
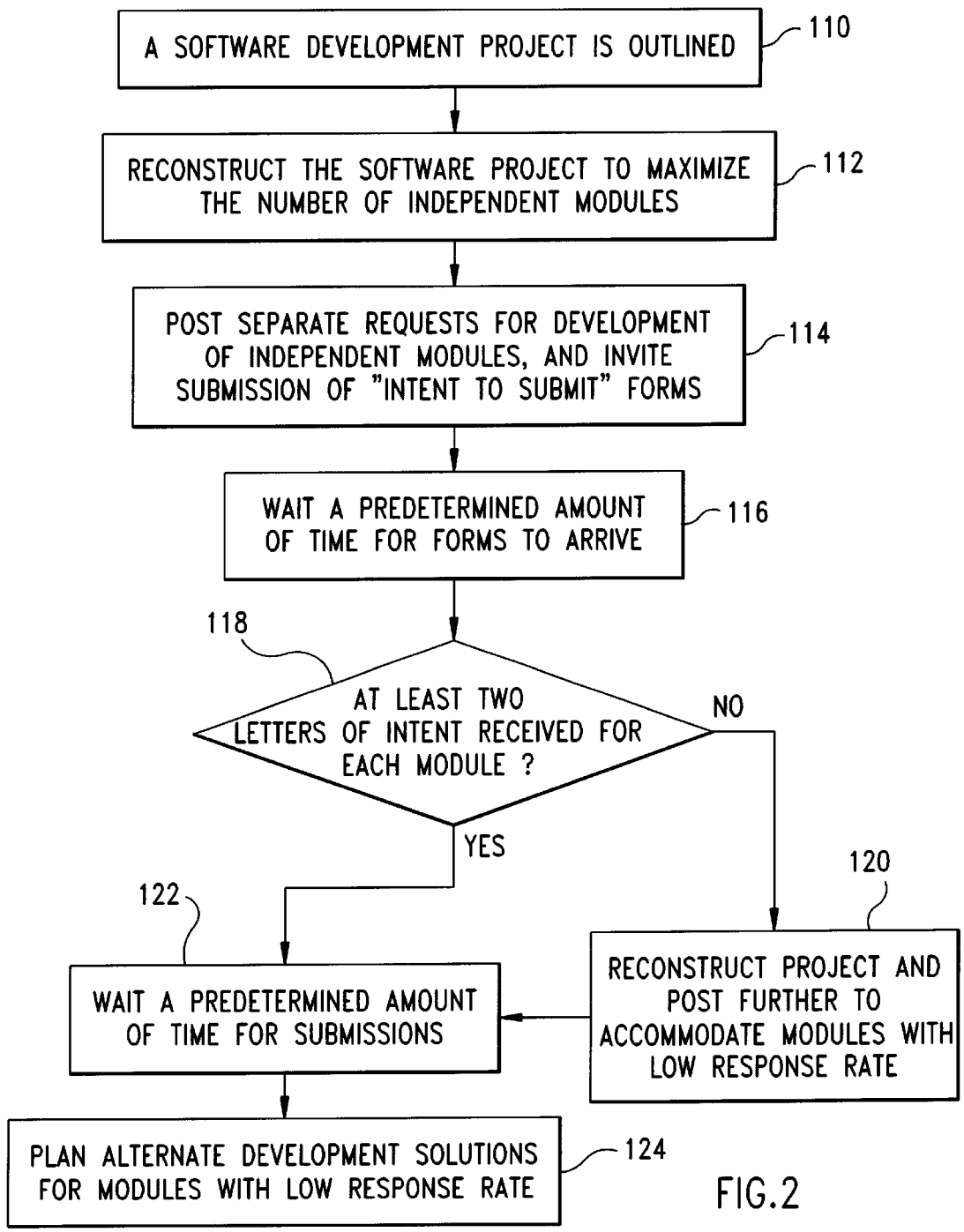
FIG. 2 is a flow chart showing an example of the preferred steps by the program package developer in requesting module development from independent programmers.

Having received the module specifications, deadlines and offering prices, the system processes requests for submissions in step 106, formatting the requests for posting. The specifications of the required modules are categorized and published together with offering prices. For example, categories may include: programming language, such as, C++ or Java; operating system, such as, Windows or Linux; technical area, such as, multi-media, database, networking or text searching; and application areas, such as financial, entertainment and commerce. The requests are maintained in a searchable database that is available to interested programmers. Optionally, customer's anonymity may also be maintained. Preferably, the requests for submissions are posted on the world-wide-web, e.g., on a dedicated web site. These first three steps are described in more detail hereinbelow with reference to FIG. 2.

In step 108, participating programmers submit solutions or candidate modules for evaluation. Programmers may search the searchable database to identify projects of interest, select one or more modules, develop a solution and submit solutions to system, e.g., using File Transfer Protocol (FTP). The system may include a facility to allow programmers to certify that they are not aware of third-party rights being violated and place conditions upon acceptance of a candidate module. Preferably, the system maintains confidentiality so that module candidates are not disseminated to other competing programmers.

Once candidate modules have been received, they may be tested in step 110. Optionally, the system may test candidate module validity for submitted solutions, rather than forwarding the module candidates to the requesting customer. For example, submitted module candidates may be passed directly to the customers or, customers may elect to have the module candidates tested for a fee, testing module validity and any other performance aspect that the customer may select. At the end of testing the system can select the best solution based on test results. Where module candidate testing results show comparable performance, priority may be assigned according to a time-stamp of the submission, e.g., first come first serve. Regardless of the test results and any priority assigned, ultimately, the customer decides which solution to buy. This testing and acceptance step 110 is discussed in more detail hereinbelow with reference to FIG. 3.

Finally, in step 112 reports are generated, both about participating programmers and about the customer. The system may maintain both statistics and raw data about actual requests, solutions, times and prices. The reports, statistics and data are available to assist customers in selecting what price should be offered for a particular module, given the complexity of the requested module and, the time frame in which the solution is required. Also, programmers may be rated by customers for use as a factor in the deciding which solution to select.

Optionally, a provision may be included to allow programmers to request a track record certification for future use. This may be used, for example, by participating student programmers, participating during their studies and having a certified record of their performance that would assist in later job applications. Also, the system may maintain a diary of module developer complaints about customers, with future requests by the same customer marked accordingly.

As noted above, FIG. 2 is a flow chart showing an example of the preferred steps in requesting module development from independent programmers that corresponds to steps 102, 104 and 106 of FIG. 1. First, in step 110, the customer outlines the software development project. Typically, this step 110 is done, to some extent, in the initial definition stages of any software development project, as the overall software package is defined. The software package outline definition would include such things as global inputs, outputs and variables, as well as the function that the package is to provide, e.g., a flight simulator. The package outline is a high level description of the package process flow that may be in the form of a flow chart or in pseudo code. The package outline provides the package developer with an overview, assisting in determining how best to modularize the package.

Then, in step 112, the package developer, reconstructs the package, reorganizing to optimize and distribute module development. Thus, the package may be reconstructed to maximize the number of independent modules, allowing the tasks to be widely distributed in small manageable module development packages. Redundant tasks may be aggregated and, for efficiency, posted as a single development module. Required modules are identified and posted on the Internet in step 114.

Optionally, at this point, programmers intending to participate may register an intention to submit a module, for example, by submitting an "intent to submit" form. Thus, the number of potential participants for any particular module may be gaged for determining the level of development interest and activity in any particular module. After posting invitations to submit "intent to submit" forms, in step 116, a reasonable period of time, e.g., a week or two is allowed to pass, so that potential participants may register. In step 118 if it is determined that one or more module does not receive at least two registered potential participants, then in step 120, part or all of the project may be reconstructed to encourage more participation for those as yet unsubscribed modules. For example, low interest modules may be combined or divided. Then, in step 122 module submissions are closed after a predetermined period of time, preferably as previously specified by the package developer in step 104.

Finally, in step 124 any remaining modules having a low response rate are evaluated (e.g., where fewer than two indications of an intention to submit are received) and, the offering price may be increased or, alternate development solutions are selected. Alternate solutions may include, for example, directly contracting a software developer or advising the customer that particular required modules must be developed differently, for example, by the customer's employees or by outside contractors. It should be expected that some modules would be not be developed by candidate developers. Coincidentally in step 124 with resorting to alternate avenues of development, completed module candidates are received in step 108 and passed to the package developer for testing or, tested in the system in step 110.

Optionally, development milestones or checkpoints maybe included to allow the customer to monitor candidate development progress. Thus, at each milestone if it is determined that development on a particular candidate or group of candidates has stalled or ceased completely, the customer may adjust development accordingly, taking whatever steps the customer deems necessary.

Figure 3:
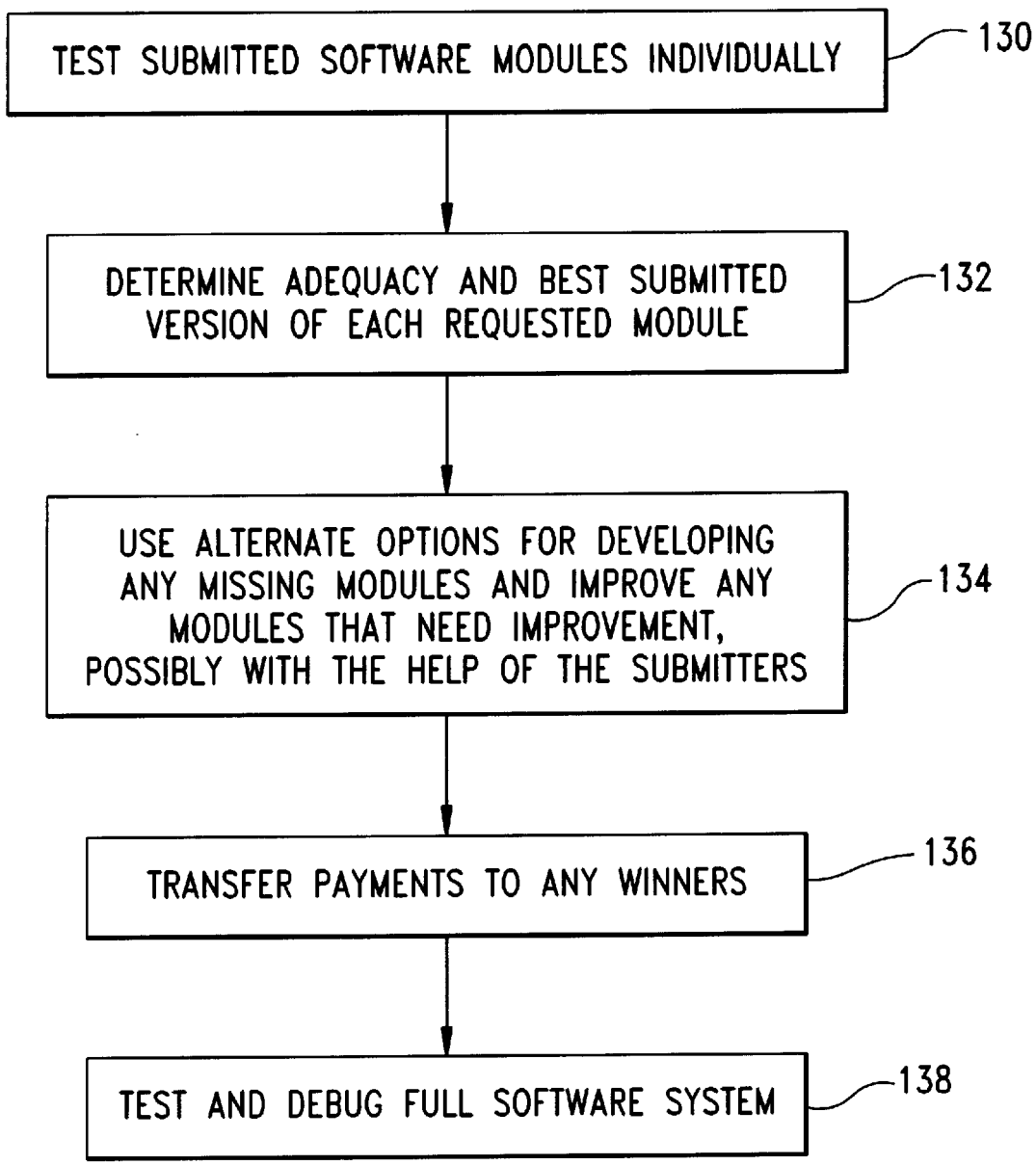
FIG. 3 is a flow chart showing an example of the steps in testing candidate modules.

FIG. 3 is a flow chart showing an example of the preferred steps in testing candidate modules, corresponding to step 110 of FIG. 1. In step 130, each received candidate module is tested, individually, for compliance with the original development request specifications provided in step 102. Previously selected benchmark tests are also performed for comparison with other competing module candidates. In step 132, based on the test results, module candidates are rated for adequacy and the best candidate is selected for each required module. In step 134 package weaknesses, such as modules without candidates or with design marginalities uncovered by testing, are identified and addressed. Module developers may be encouraged to correct any marginalities, providing limited additional development time to candidate developers or, reopening development to all participating developers. So, alternate development solutions that were identified in step 124 may be employed to develop missing modules.

As module candidates are selected, in step 136 the selected module programmers or winners are paid. Non-winning submission developers may be awarded a pre-authorized small payment as an additional incentive. For example, small payments may be awarded to those developers that submitted letters of intent and who actually produce module submissions that pass the module tests but are not selected. Typically, payment would not be offered to every submission without knowing the number of submissions in advance. Finally, in step 138 all of the selected modules are integrated into the software package and, optionally, the system tests the software package against the originally provided package developer specifications.

While the invention has been described in terms of preferred embodiments, those skilled in the art will recognize that the invention can be practiced with modification within the spirit and scope of the appended claims.

What is claimed is:

1. A method of computer program development comprising the steps of:
   a) providing module requirements for modules to be included in a computer program being developed, including outlining said computer program and organizing the computer program outline to identify a plurality of categorized required modules;
   b) posting a list of required modules and corresponding requirements for each listed required module by category;
   c) waiting until a specified waiting period for receiving candidates for required modules has expired and then determining if at least two indications of an intention to submit a candidate have been received for each required module;
   d) testing received module candidates for compliance with module requirements; and
   e) selecting best modules from said tested module candidates as modules included in said computer program.

2. A method of computer program development as in claim 1, wherein the step (a) of providing module requirements comprises the further step of partitioning the computer program to maximize the number of independent modules while identifying the programming skill level required for development of particular modules.

3. A method of computer program development as in claim 1, wherein module requirements are provided by placing said requirements in at least one of a searchable database and a web site, said module requirements comprising module specifications, a corresponding price and a deadline.

4. A method of computer program development as in claim 1, comprising the further step of maintaining module submitter confidentiality.

5. A method of computer program development as in claim 1, comprising the further step of maintaining anonymity for computer program developers.

6. A method of computer program development as in claim 1, comprising the further step of allowing module submitters to place conditions upon selection of submitted modules.

7. A method of computer program development as in claim 1, comprising the further step of awarding a predetermined incentive payment to submitters of acceptable but non-selected modules.

8. A method of computer program development as in claim 1, wherein for each listed module with two or more received indications of an intention to submit, the step (b) of posting the list of required modules comprises the further step of waiting for a corresponding submission deadline to occur.

9. A method of computer program development as in claim 1, for any listed module wherein fewer than two indications of an intention to submit are received by the end of said waiting period, the step (b) of posting the list of required modules comprises the further steps of:
   reorganizing said computer program outline;
   revising said list of required modules according to said reorganized computer program outline; and
   posting said revised list of required modules.

10. A method of computer program development as in claim 9, wherein said revising includes increasing an offered price to encourage additional developer participation.

11. A method of computer program development as in claim 1, wherein in step (c) of receiving modules candidates, if fewer than two module candidates are received for at least one listed required module, then said method comprising the further step of:
   f) initiating additional development for each said at least one listed module.

12. A method of computer program development as in claim 1, comprising the further step of enabling program developers and module submitters to maintain rating information about each other.

13. A method of computer program development as in claim 1, wherein in step (d) of testing modules candidates, module developers of one or more module candidates are allowed to perform the further step of improving said one or more module candidates before the step (e) of selecting candidates for inclusion in the computer program.

14. A method of computer program development as in claim 1, further comprising the step of:
   f) transferring payment to developers of said module candidates selected for inclusion in said computer program.

15. A method of computer program development as in claim 14, further comprising the steps of:
- g) including said selected best modules in said computer program; and
- h) testing said computer program.

16. A computer program product for computer program development, said computer program product comprising a computer usable medium having computer readable program code thereon, said computer readable program code comprising:

computer readable program code means for receiving module requirements;

computer readable program code means for listing required modules, including code means for categorizing and then posting required modules, and code means for waiting until a specified waiting period has expired and then determining if at least two indications of an intention to submit a module candidate have been received for each required module;

computer readable program code means for receiving module candidates; and computer readable program code means for testing module candidates for compliance with said module requirements.

17. A computer program product for computer program development as in claim 16, wherein said computer readable program code means for listing required modules further comprises:

computer readable program code means for receiving a revised list of required modules according to a reorganized computer program outline, when less than two indications of an intention to submit are received for one or more required modules;

computer readable program code means for posting said revised listed required modules; and computer readable program code means for waiting for a corresponding submission deadline to occur.

18. A computer program product for computer program development as in claim 17, wherein said computer readable program code means for testing module candidates comprises:

computer readable program code means for selecting a module candidate for each required module for inclusion in said computer program; and computer readable program code means for transferring payment to developers of said selected module candidates.

19. A computer program product for computer program development as in claim 18, further comprising:

computer readable program code means for including selected module candidates in said computer program; and computer readable program code means for testing said computer program.

20. A computer program development system for developing computer programs, said computer program development system comprising:

means for receiving module requirements;

means for posting required modules by category, including means for waiting until a specified waiting period has expired and means for determining for each required module if at least two indications of an intention to submit a module candidate have been received by the end of said waiting period;

means for receiving candidate modules; and means for testing module candidates for compliance with module requirements.

21. A computer program development system for developing computer programs as in claim 20, said means for posting required modules further comprising:

means for receiving a revised list of required modules according to a reorganized computer program outline, when less than two indications of an intention to submit are received for one or more required modules;

means for categorizing and posting said revised list of required modules; and means for waiting for a corresponding module candidate submission deadline to occur.

22. A computer program development system for developing computer programs as in claim 21, said means for testing module candidates comprising:

means for selecting a module candidate for each required module, said selected module candidates being selected for inclusion in said computer program; and means for transferring payment to developers of said selected module candidates.

23. A computer program development system for developing computer programs as in claim 22 further comprising:

means for including selected module candidates in said computer program; and means for testing said computer program.

\* \* \* \* \*